US006795556B1

(12) United States Patent
Sibbald et al.

(10) Patent No.: US 6,795,556 B1
(45) Date of Patent: Sep. 21, 2004

(54) METHOD OF MODIFYING ONE OR MORE ORIGINAL HEAD RELATED TRANSFER FUNCTIONS

(75) Inventors: Alastair Sibbald, Berkshire (GB); Richard David Clemow, Bucks (GB); Michael Percy, London (GB)

(73) Assignee: Creative Technology, Ltd. (SG)

( * ) Notice: Subject to any disclaimer, the term of this patent is extended or adjusted under 35 U.S.C. 154(b) by 0 days.

(21) Appl. No.: 09/579,122

(22) Filed: May 25, 2000

(51) Int. Cl.[7] .............................. H04R 5/00; H04R 5/02; H04G 3/00
(52) U.S. Cl. .................. 381/17; 381/1; 381/61; 381/307; 381/310
(58) Field of Search .................... 381/1, 17, 307, 381/309, 310, 61, 63

(56) References Cited

U.S. PATENT DOCUMENTS

| | | | | |
|---|---|---|---|---|
| 5,666,425 A | * | 9/1997 | Sibbald et al. | 381/26 |
| 5,729,612 A | * | 3/1998 | Abel et al. | 381/56 |
| 5,802,180 A | * | 9/1998 | Abel et al. | 381/17 |
| 6,009,179 A | * | 12/1999 | Wood et al. | 381/17 |
| 6,067,361 A | * | 5/2000 | Kohut et al. | 381/17 |
| 6,181,800 B1 | * | 1/2001 | Lambrecht | 381/310 |
| 6,307,941 B1 | * | 10/2001 | Tanner et al. | 381/17 |
| 6,498,857 B1 | * | 12/2002 | Sibbald | 381/310 |
| 6,577,736 B1 | * | 6/2003 | Clemow | 381/17 |
| 6,614,910 B1 | * | 9/2003 | Clemow et al. | 381/1 |

* cited by examiner

*Primary Examiner*—Minsun Oh Harvey
*Assistant Examiner*—Laura A. Grier
(74) *Attorney, Agent, or Firm*—Russell N. Swerdon; Creative Technologies LTD

(57) ABSTRACT

Original head-related transfer functions (HRTFs) are modified for a non-standard dimensioned head. The HRTF includes a near-ear response function, a far-ear response function, and an inter-aural time delay (ITD). The modified HRTF resembles an HRTF approximating that derived for a listener having different head and/or ear dimensions to the standard dimensions. The ITD value of the HRTF is multiplied by a given scaling factor independent of frequency. The near ear and/or far ear response function of the HRTF is multiplied by a constant scaling factor in the frequency domain independent of time delay, to expand or compress the functions in the frequency domain. The near ear and/or far ear response function of the HRTF are provided with a positive or negative offset value in the frequency domain. The amplitude of the near ear and/or far ear response function of the original HRTF(s) is (are) multiplied by a given gain factor.

12 Claims, 9 Drawing Sheets

HRTF Processing diagram

HRTF Measurement

HRTF Processing diagram

Plan view showing inter-aural time-delay (ITD) across the head

Interpolation of the expanded characteristic between $p_f y_f$ and $p_g y_g$

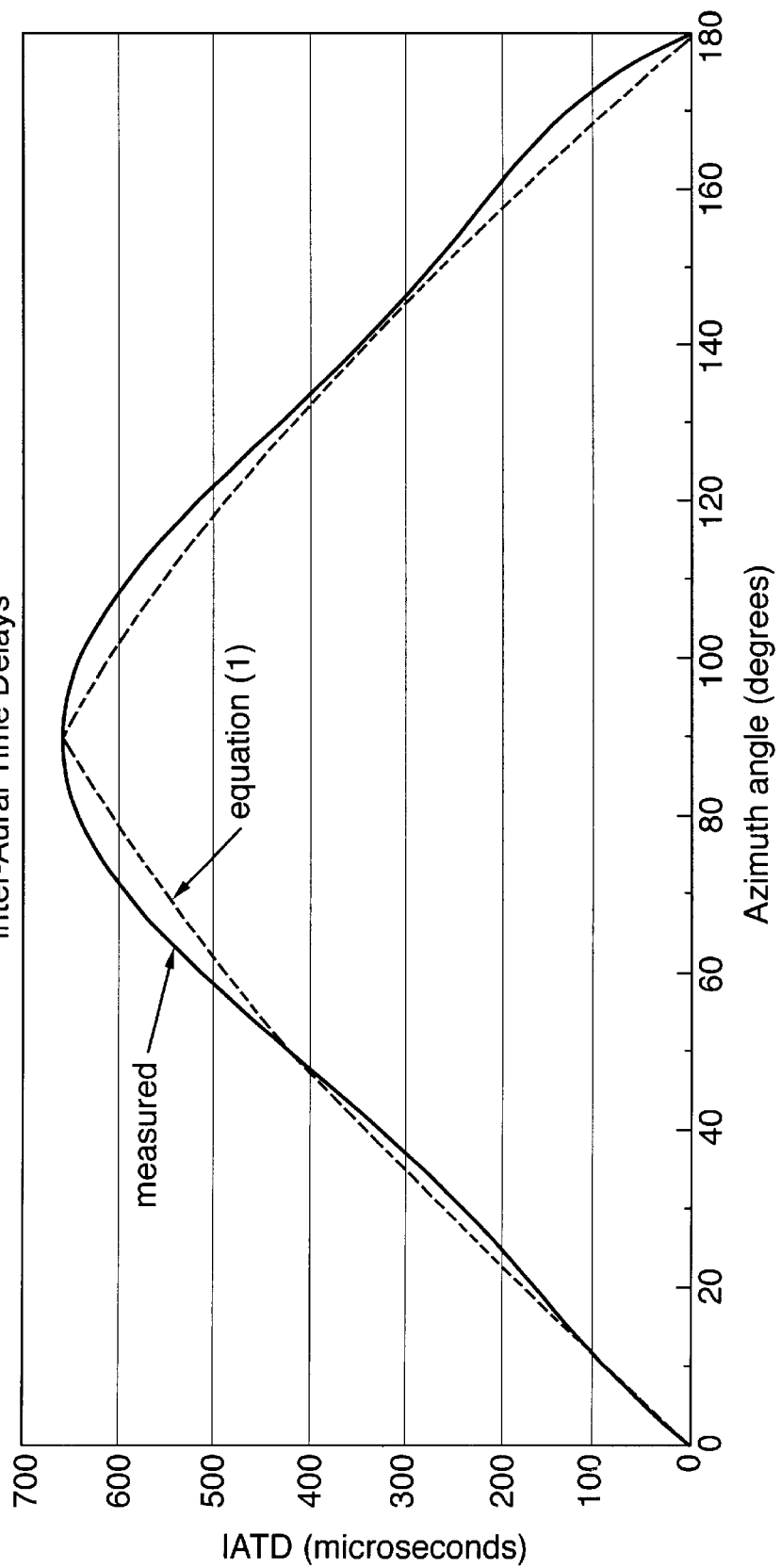

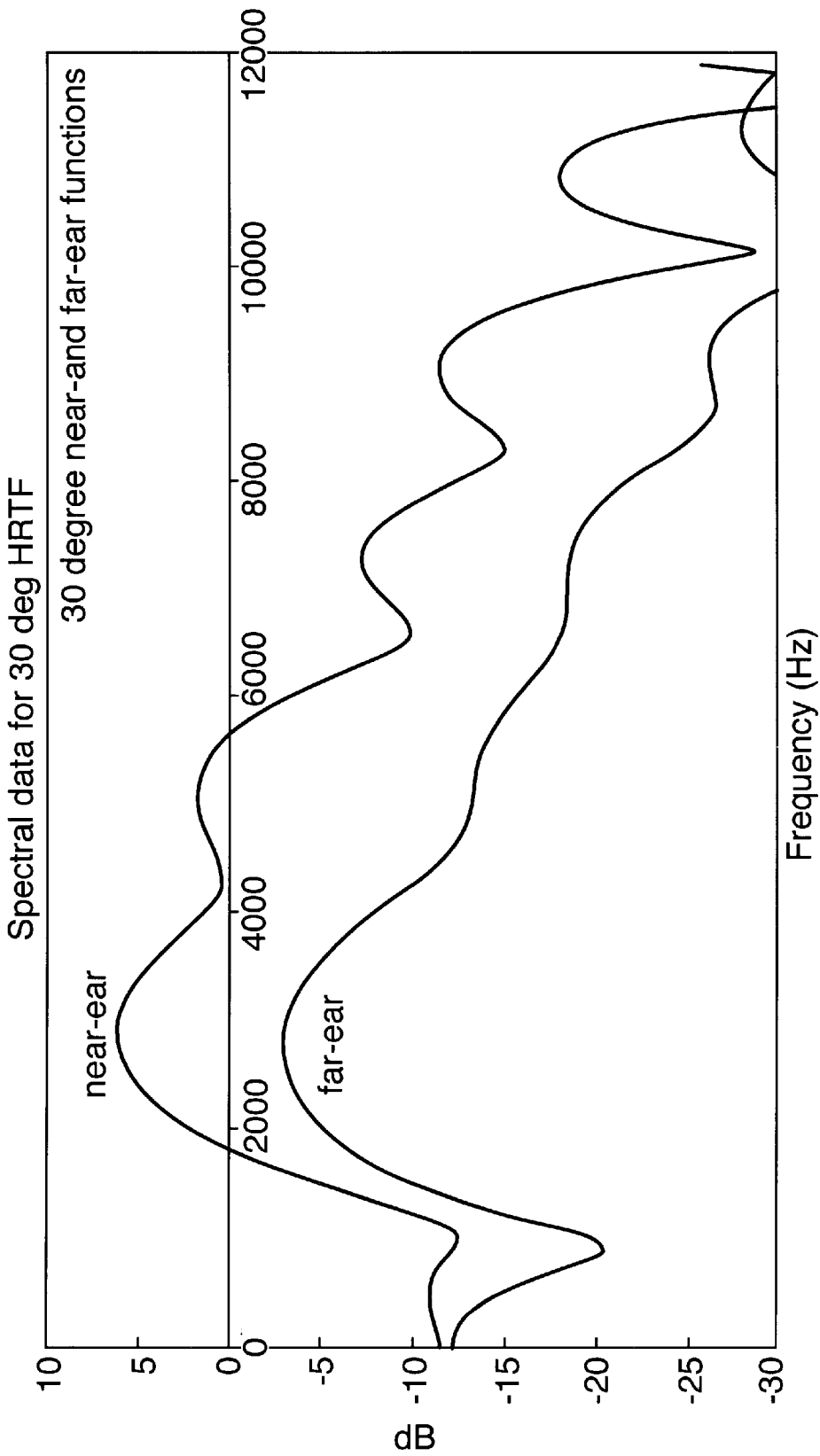

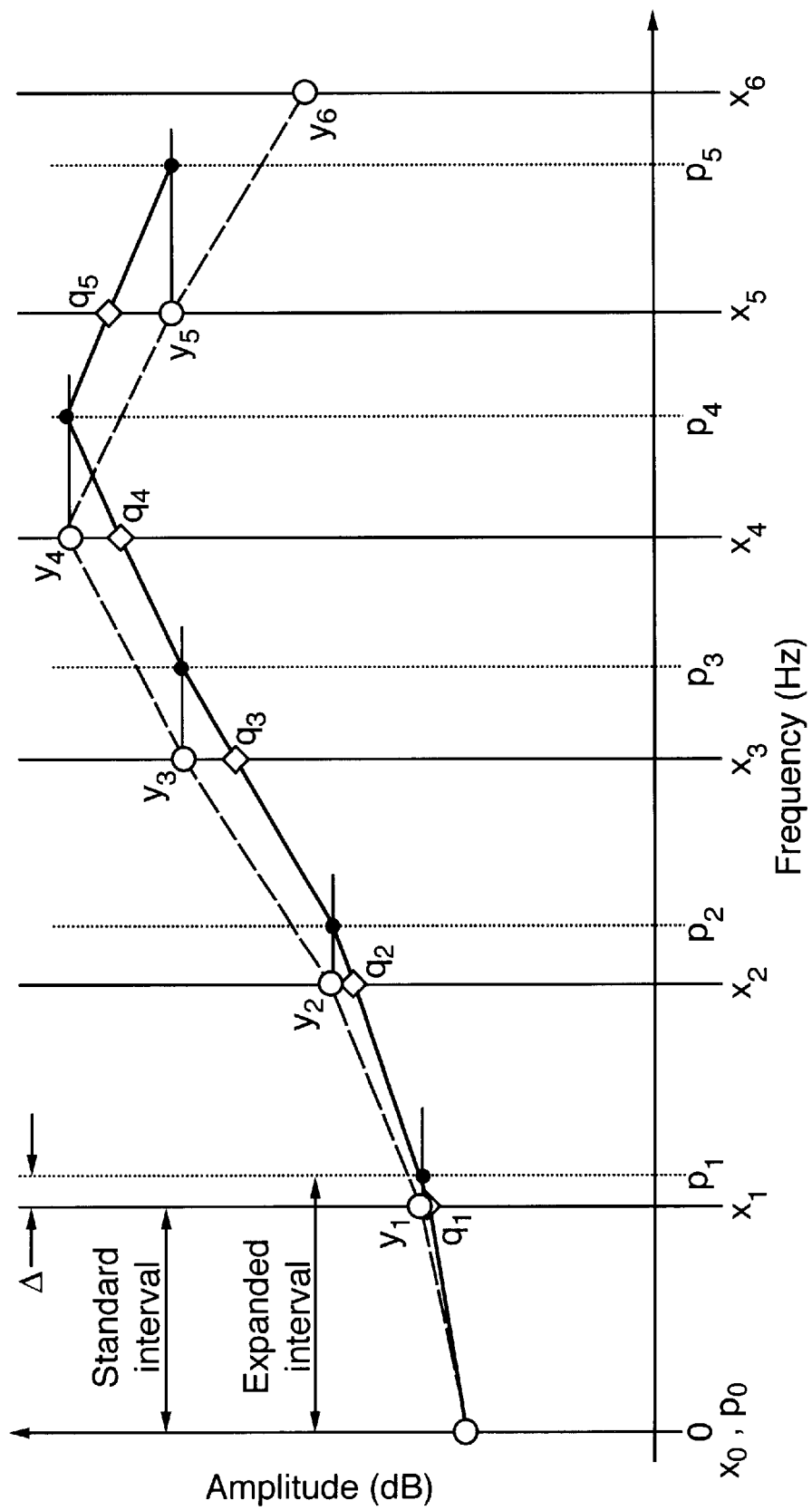
Fig.6. Interpolation of spectral data

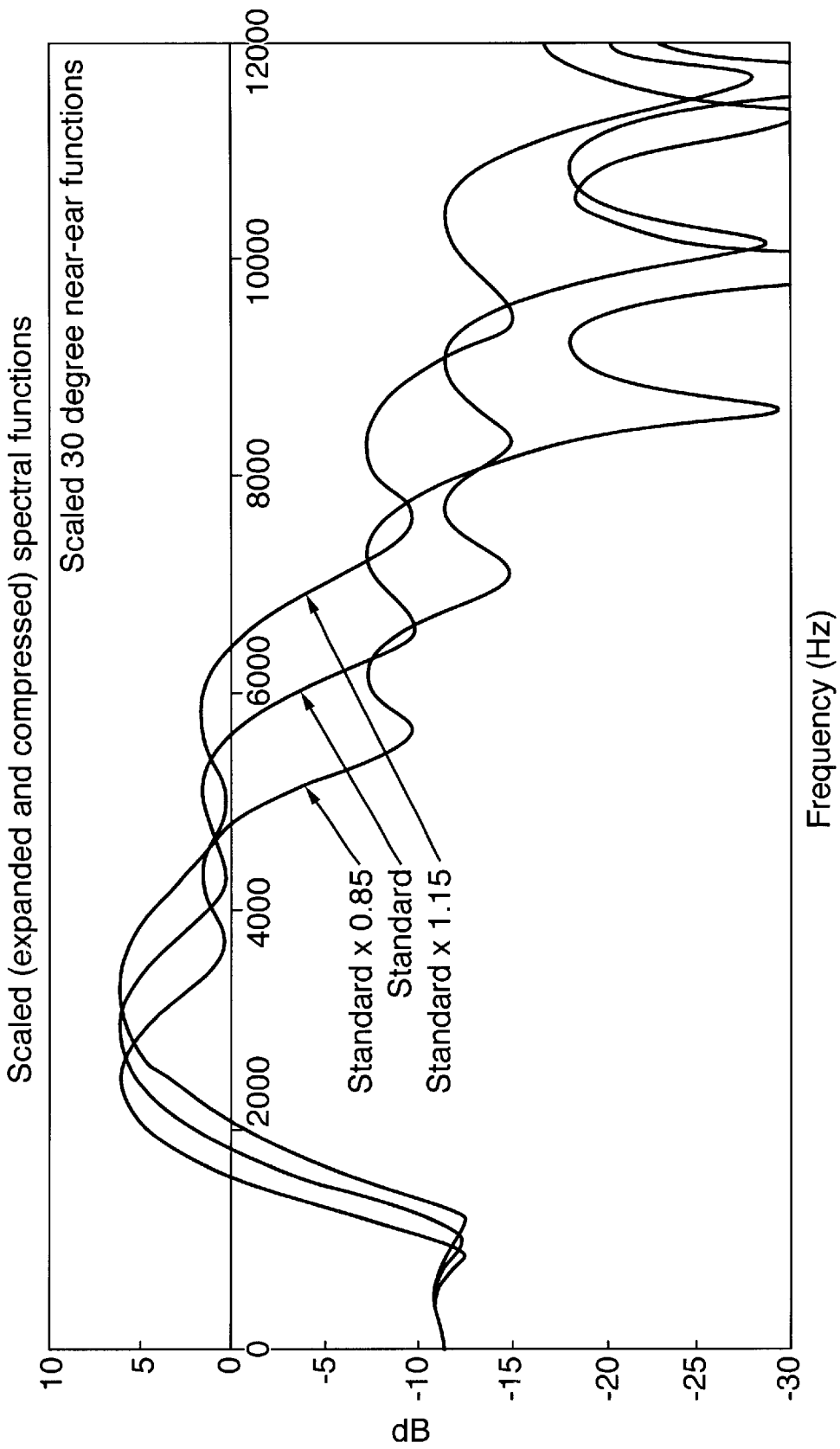

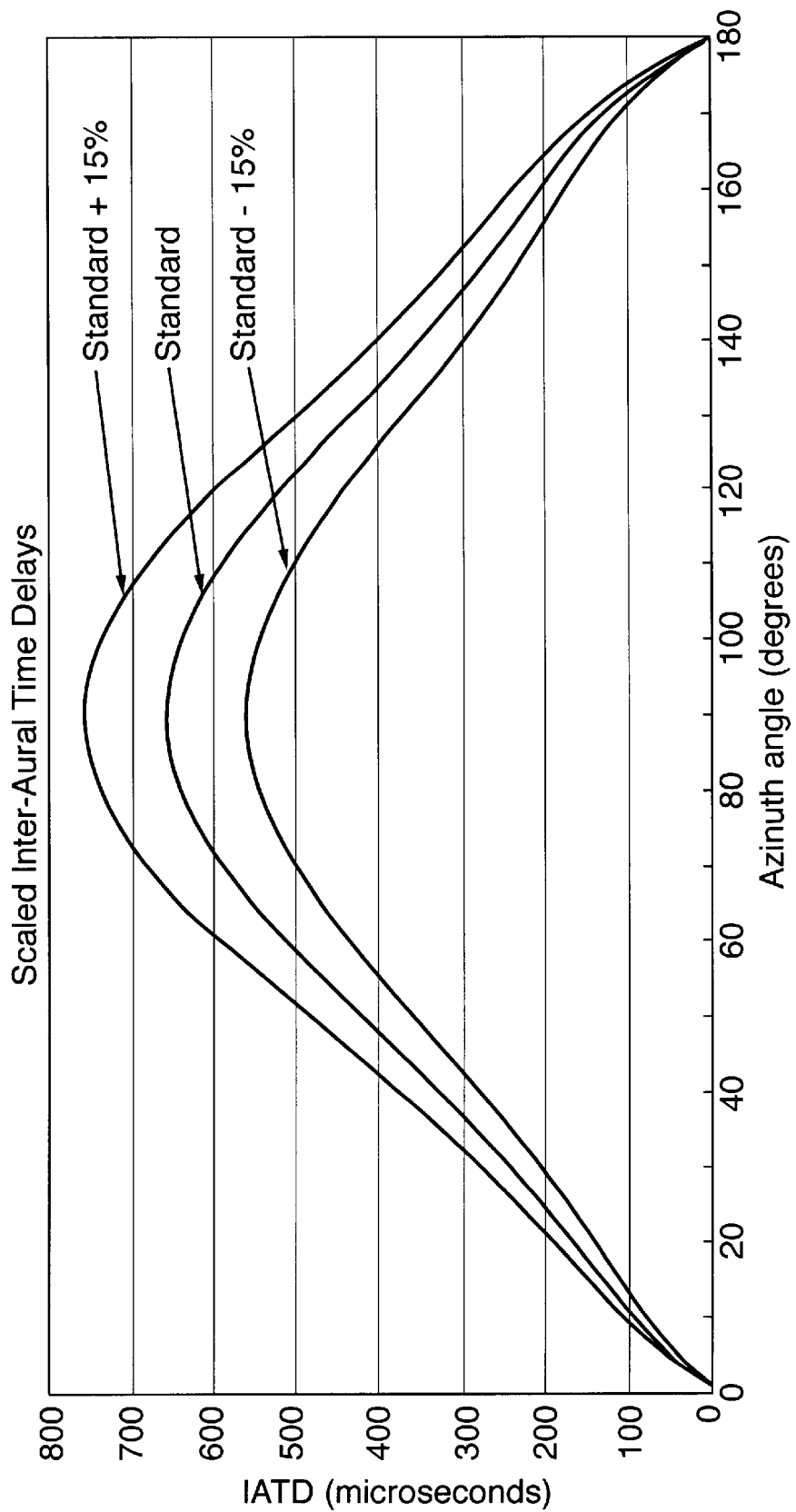

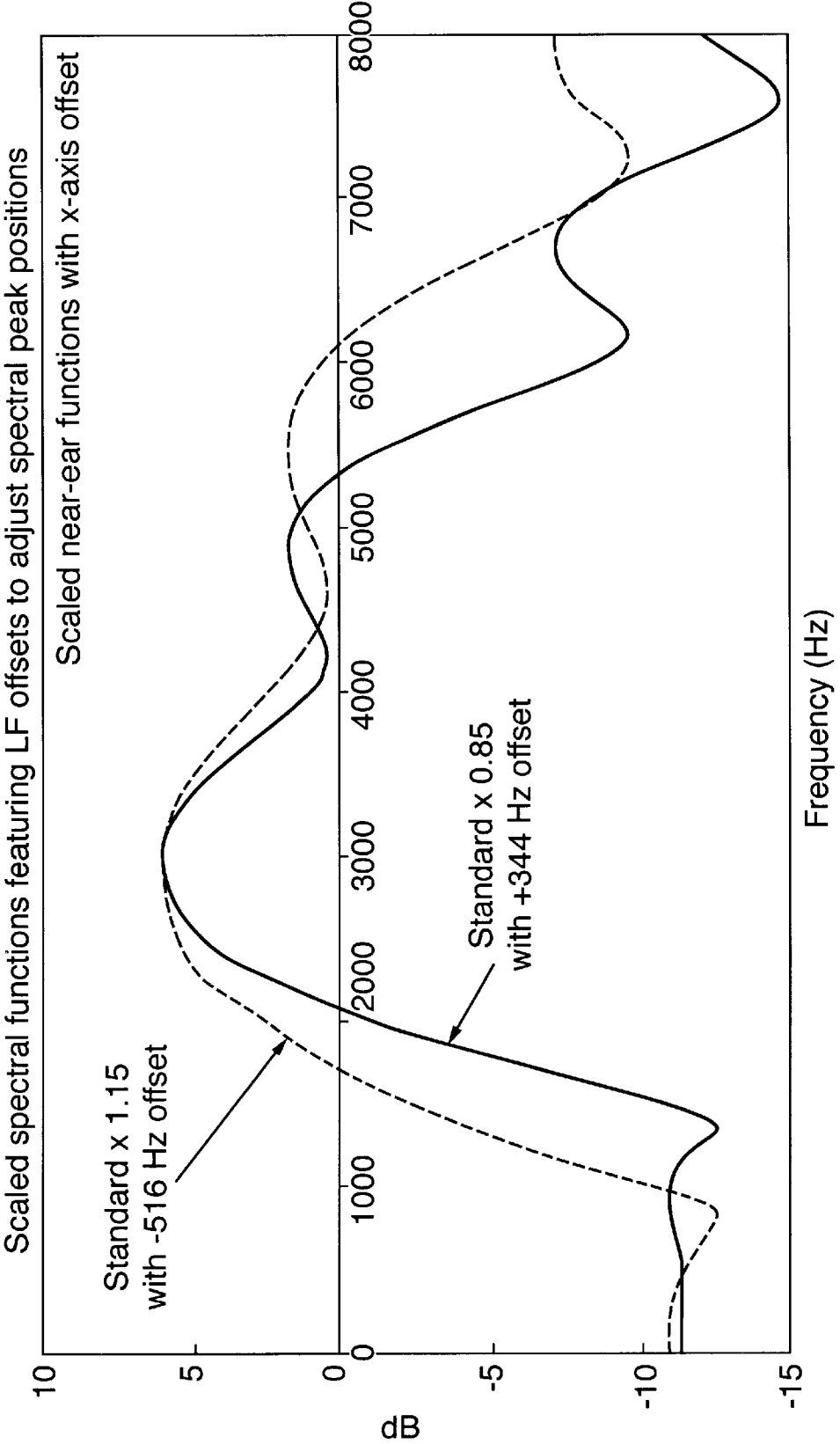

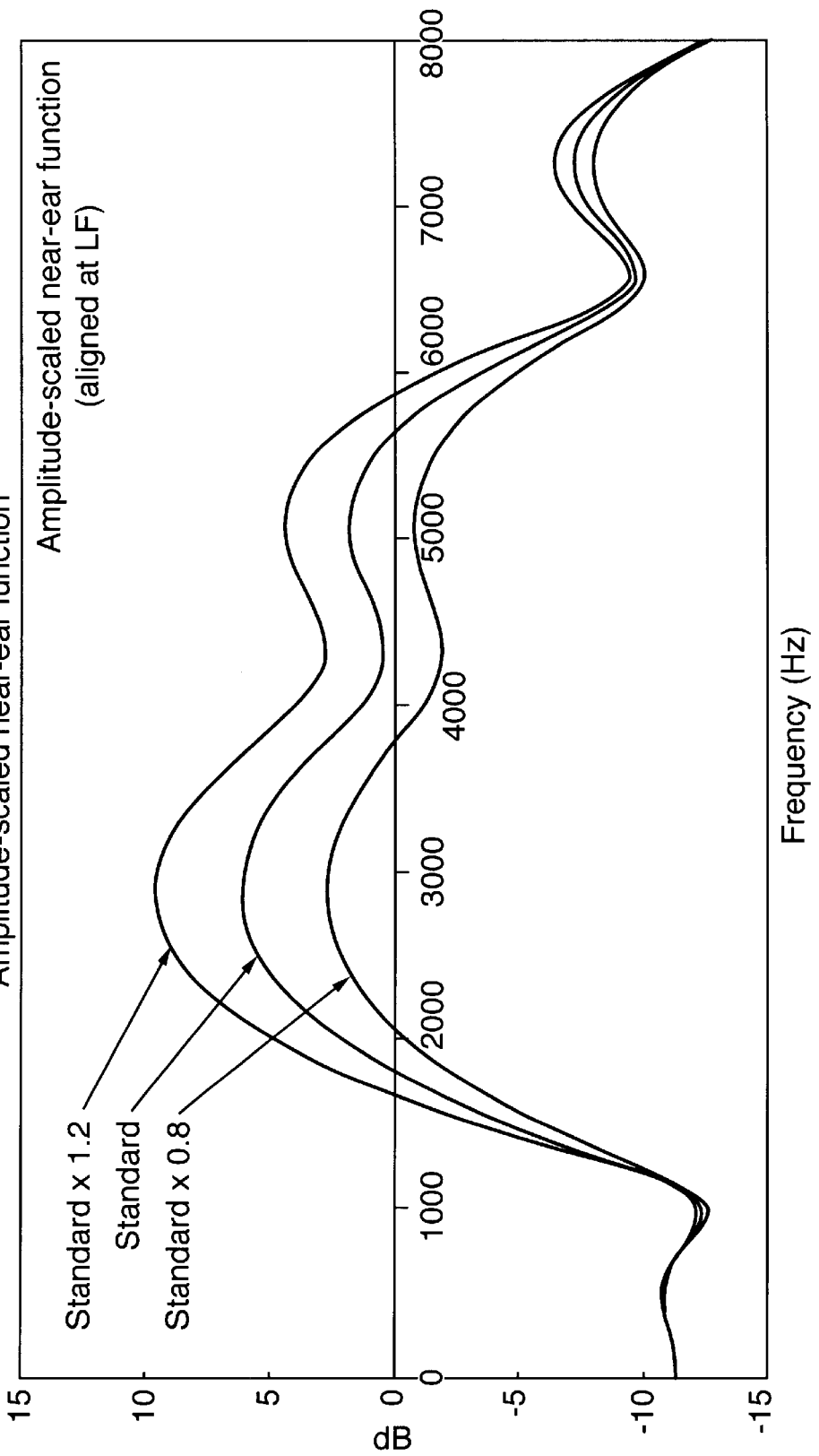

METHOD OF MODIFYING ONE OR MORE ORIGINAL HEAD RELATED TRANSFER FUNCTIONS

BACKGROUND OF THE INVENTION

1. Field of the Invention

The present invention relates to the reproduction of 3D-sound from plural-speaker audio systems or headphones, and, in particular, to the creation of Head-Related Transfer Functions (HRTFs) which are used for the synthesis of 3D audio signals. The synthesis of 3D audio signals has been described in a number of previous patent applications including U.S. Pat. No. 5,666,425, WO98/52382, and co-pending application GB 9805534.6. The latter contains a comprehensive description of how HRTFs are used in the synthesis of 3D sound, and is incorporated herein by reference.

2. Background of Related Art

One of the most important applications for 3D audio at present is 3D positional audio processing for computer games, and it is becoming increasingly important for other applications such as consumer electronics products (virtualisation of surround-sound via only two loudspeakers or headphones) and in the production of recorded music. In order to synthesise audio material bearing 3D-sound cues for the listener to perceive, the signals must be convolved with one or more appropriate HRTFs, and then delivered to the listener's ears in such a way that his or her own hearing processes do not interfere with the in-built 3D cues. This is achieved either by listening through headphones, or via loudspeakers in conjunction with a suitable transaural crosstalk-cancellation scheme.

If the listener is to perceive synthesised 3D-sound cues correctly, it is important that the synthesised cues are similar to their own natural ones, and so the HRTFs used for synthesis must be similar to the listener's own HRTFs. This is accomplished by creating an artificial head and ears having the dimensions of an average human adult, and making HRTF measurements on it. Our own method of achieving this has been fully described in WO 98/52382.

This method has been implemented and is very satisfactory for most users. However, there is a small proportion of listeners who have ear and head dimensions which are significantly different to the average, and for them the perceived 3D-sound effects can be spatially less accurate, or tonally incorrect. Accordingly, it would be advantageous to accommodate these individuals by creating HRTF sets which are based on head and ear dimensions closer to their own, such that they can choose to use this particular option, if it were provided, during a set-up option prior to using a 3D-audio system. The present invention relates to the creation of scaleable HRTF data, suitable for accommodating a wide range of physiological variation amongst listeners, and based on a single, average HRTF data set.

It is well-recognised that there exists significant physiological variation in the dimensions of the ears, head and neck, and that these influence any related acoustic measurements, including HRTF data. The use of artificial head systems has been employed in research and development for the optimisation of hearing-aid technology, in which microphones have been incorporated into rubber-type replicas of the human outer-ear and then built into an artificial head assembly. Some of these artificial head systems have also featured auditory canal simulators, together with neck and torso assemblies. In one well-known study by Burkhard and Sachs ("Anthropometric manikin for acoustic research", M D Burkhardt and R M Sachs, J. Acoust. Soc. Am., July 1975, 58, (1), pp 214), ear dimension measurements were made on twelve male and twelve female volunteers, such that average dimensions of the various physiological features could be calculated. Next, the individual having ear dimensions which were closest to this average was identified, and then his ears were used as replication masters, from which copies were moulded in a flesh-like rubber compound (a mixture of two silicone rubbers to provide similar mechanical properties to flesh). This work produced a manikin and various ear types which are available from the Knowles Electronics Company (Knowles DB series product information (S-554-109), Knowles Electronics Inc., 1151 Maplewood Drive, Itasca, Ill. 60143, USA, under the trade name KEMAR (Knowles Electronics Manikin for Acoustic Research). According to the literature, there are four different ear types available. The original ears (DB-060/DB-061) are small and typical of American and European females, as well as Japanese males and females. Large ears (DB-065/DB-066) are more typical of American and European male pinna sizes. The DB-060/DB-061 and DB-065/DB-066 ears have been used extensively for tests of BTE (behind-the-ear) hearing instruments and for sound recording. Their ear canal openings are relatively small, which make them less suitable to use with ITE (in-the-ear) and ITC (in-the-canal( hearing instruments. The DB-090/DB-091 are large rubber ears with larger ear canal openings for use during the development of ITE and ITC hearing instruments. They permit the use of a common earmold so the hearing instrument can be quickly installed or removed. The DB-095/DB-096 are another variation of the large ears designed to be used with ITE and ITC hearing instruments which have user earmolds.

Details about the construction of the DB-065/DB-066 larger ear replica have been published ("Larger ear replica for KEMAR manikin R J Maxwell and M D Burkhardt, J. Acoust. Soc. Am., April 1979, 65, (4), pp. 1055–1058). The ear was based on one of the original sample of twenty four volunteers, and chosen to be two standard deviations larger than the average ear. For example, the original, average dimensions of various features of the standard ear (with the +2 standard deviation value in square brackets) were as follows. Concha length: 2.4 cm [2.9 cm]; concha volume: 4 $cm^3$ [5.7 $cm^3$]; concha breadth: 1.7 cm [2.0 cm].

In principle, therefore, it would be possible to employ an artificial head system, such as the KEMAR, which is capable of mounting various ear replicas of differing sizes, for the measurement of a complete library set of HRTFs for each ear type. The listener could then choose which of these particular HRTF libraries to use, in order to obtain HRTFs which are the best match to their own. However, it must be appreciated that a typical HRTF library might contain more than 1,000 individual HRTFs (each containing both a left- and right-ear function, and an inter-aural time delay), and so it might take several weeks and much effort to carry out the acoustic measurements on a single ear type.

Also, it will be appreciated that if a number of ear-types were being measured sequentially, then experimental variations would inevitably occur between the measurements, leading to some imperfections in the matching of the inter-type data.

More importantly, there is physiological variation not only in ear size, but in head size, too. If this factor were also incorporated into the artificial head, it would render the measurements much more cumbersome and time consuming. For example, there would be nine measurement sessions needed for combinations of small, medium and large heads with small, medium and large ears. Although this is not impossible, it is the nature of technology that small incremental improvements occur frequently, and so if an improved average ear structure were to be developed, clearly it would be advantageous to make only one single set of measurements, rather than nine sets.

The use of differing HRTF libraries based on different shaped ears is known: in the early 1990s a commercially available binaural sound processor made by Crystal River Inc. offered several HRTF filter set options based on different ear types. There is also a headphone virtualiser for Dolby Pro-Logic audio material which offers the user a selection from 15 different HRTF types, as disclosed in WO 97/25834. This is apparently based on making a database from numerous measurements on a large number of volunteers, and then grouping the HRTF characteristics into 15 different categories, from which one typical HRTF type is selected by the listener.

As far as the inventors are aware, there is no explicit disclosure in the prior-art literature of any HRTF sets which incorporate a head-size or head-shape variation (although the KEMAR technology does offer several neck-length options).

3. The Invention

According to the present invention, there is provided a method and apparatus as specified in the claims.

BRIEF DESCRIPTION OF THE DRAWINGS

Embodiments of the invention will now be described, by way of example only, with reference to the accompanying schematic drawings, in which:

FIG. 4 shows a comparison between modelled ITDs and experimental measurements using an artificial head, FIG. 5 shows the near ear and far ear response functions as a function of frequency for a sound source placed at an angle of 30 degrees, FIG. 6 and FIG. 10 show how the ear response functions can be scaled using linear interpolation, FIG. 7 shows a 30 degree near ear response function for a standard dimension ear, and response functions scaled in the frequency domain by 15% upwards and 15% downwards, FIG. 8 shows how the inter-aural time delay is scaled linearly to correspond to larger and smaller head sizes, FIG. 9 shows how an ear response function can be offset along the frequency axis to adjust the positions of peaks in the spectrum, and FIG. 11 shows how the magnitude of the ear response function can also be scaled.

SUMMARY OF THE INVENTION

In a first aspect, the present invention provides a modified HRTF data set, and a method for creating such a modified HRTF data set from an existing HRTF data set, in which:

(a) the existing HRTF data set corresponds to a head and ears of average dimensions;

(b) the modified HRTF data set corresponds to a head and ears which are dimensionally scaled with respect to the head and ears relating to the existing HRTF data set.

The invention enables HRTF users to select an option which corresponds to their own physical dimensions. An important feature of the invention is the ability to scale the ear dimensions and head dimensions independently, and then combine the results so as to provide a range of permutations.

The invention is especially advantageous in that it is a method for modifying existing HRTF data, rather than resorting to the manufacture of revised physical structures and the considerable associated time and effort required to characterise them and convert the data into filter coefficients. In addition to this saving, the method confers several other important benefits:

(a) No specialised hardware or tools are required (the manufacture of ear shapes can use expensive stereolithography CNC equipment).

(b) Precision (and infinitely-variable) scaling.

(c) Homogeneity between resultant HRTF libraries (because they are all based on the same data).

(d) No errors or artefacts occur because of physical factors in modelling or measurements.

DETAILED DESCRIPTION OF ILLUSTRATIVE EMBODIMENTS

The invention is described below in several stages. First, a typical HRTF is described in terms of its constituent parts, namely a left-ear spectral function, a right-ear spectral function and an inter-aural time-delay (ITD). Next, it is proposed that, because (a) the spectral functions are largely ear-size dependent, and (b) the time-delay element is largely head-size dependent, then the two factors can be scaled independently as a duplex system. From this new observation, it is illustrated how the spectral data of the example HRTF can be transformed into (a) a scaled up (+15%) version, and (b) a scaled down (−15%) version with respect to ear size. It is then illustrated how the ITD data of the example HRTF can be transformed into (a) a scaled up (+15%) version, and (b) a scaled down (−15%) version with respect to head size. Finally, scaling of the magnitude of the ear response function in the frequency domain is discussed.

3.1 Typical HRTF Function

Figure 1:
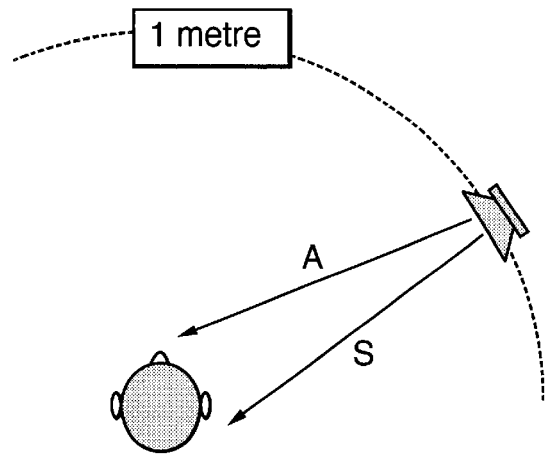
FIG. 1 shows an arrangement of head and loudspeaker commonly used for HRTF measurements.

The measurement of HRTFs is carried out in anechoic conditions, preferably. A common method is to place a loudspeaker at about 1 metre distance from the artificial head (FIG. 1), at the required azimuth and elevation angle, and then to transmit impulses into the system whilst recording the responses of the microphones situated in the ears (or ear canals, if present). The impulses are of a particular type which contain equal energy at all points across the audio spectrum, and this enables the spectral response of each artificial ear to be computed. It also enables the time-of-arrival difference of the impulse between left and right ears to be derived, and these three elements comprise the HRTF itself: a far-ear response (often termed A), a near-ear response (S) and an inter-aural time-delay. The latter lies in the range 0 to 650 $\mu$s. The spectral profiles of the ears are position dependent, and generally show a peak of around +15 dB at 5 kHz, caused by the concha resonance, and they often exhibit considerable spectral detail. If an auditory canal simulator is present, then the peak is greater and at a lower frequency.

Figure 2:
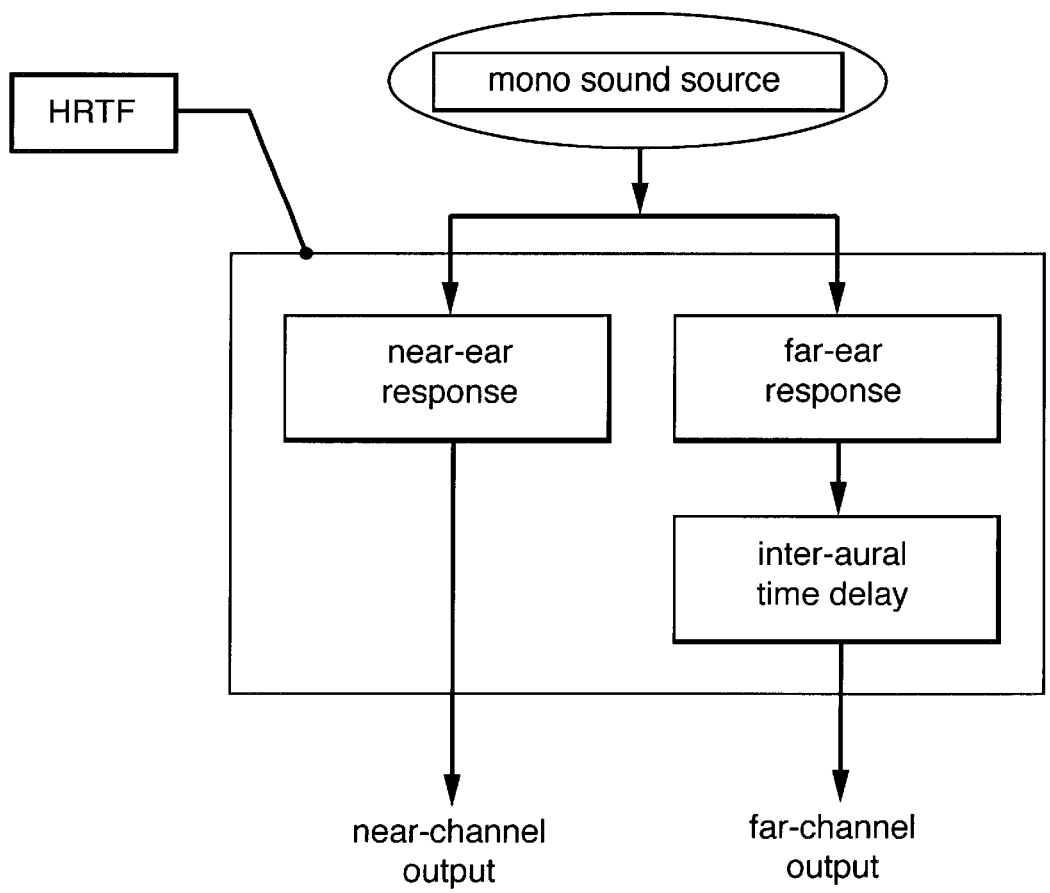
FIG. 2 shows a diagram to illustrate the elements of HRTF signal processing.

These functions are converted into digital signal-processing algorithms which simulate electronically what the head and ears do acoustically, as is shown above in FIG. 2. A typical spectral response is shown in FIG. 5. In this case the data are representative of a non-canal based artificial head system, measured at azimuth 30° in the horizontal plane.

3.2 Inter-Aural Time-Delays (ITD)

As has already been noted, there is a time-of-arrival difference between the left and right ears when a sound wave is incident upon the head, unless the sound source is in one of the pole positions (i.e. directly in front, behind above or below), or indeed anywhere in the median plane. The inter-aural time delay is a complex factor which can be can be derived both by mathematical modelling and by practical experimentation. In terms of modelling, it is common practise to treat the head as a hard, rigid sphere, having a radius of 8.75 cm or thereabouts, and consider its interaction with plane, progressive harmonic waves. The sound waves diffract around the head in three-dimensions in a frequency dependent manner, forming creeping waves which travel entirely around it. Consequently, the sound pressure level characteristics at the far-ear can be considered as the integral sum of many elemental waves travelling differing paths, and so the system is a dispersive one. The validity of any mathematical model is dependent on the quality of the modelling parameters, and this restricts the accuracy and extent to which the ITD can be modelled. However, there is reasonably good agreement between the ITDs obtained from a simple geometrical model and from physical measurements on an artificial head ("Acoustical characteristics of the outer ear", E A G Shaw, Encyclopaedia of Acoustics, M J Crocker (Ed.), John Wiley and Sons (1997), pp. 1325–1335), and so the simple geometrical model can be used to predict ITDs for instances when it becomes difficult to extract the ITD from actual measurements made on an artificial head.

Figure 3:
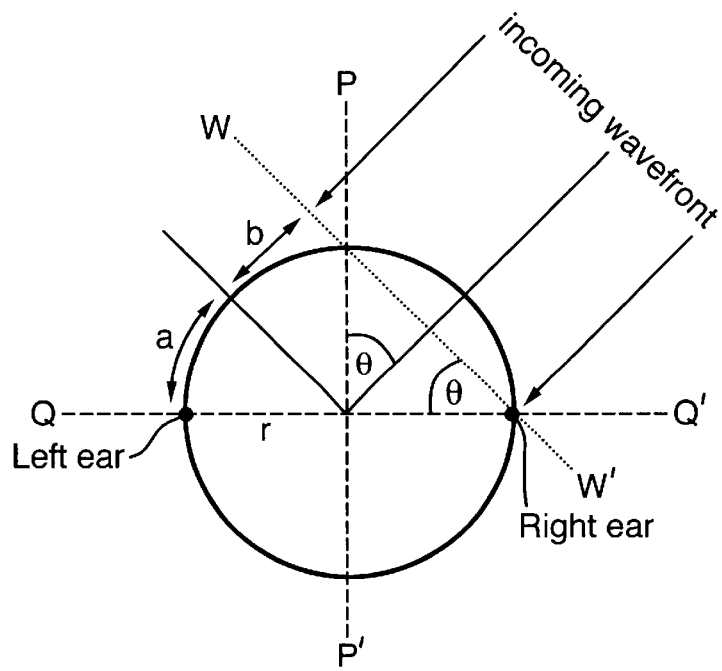
FIG. 3 shows a plan view of a spherical model head showing how the interaural time delay (ITD) is modelled.

A simple method for deriving the inter-aural time delay is depicted in diagrammatic form in FIG. 3, which shows a plan view of a conceptual head, with left ear and right ear receiving a sound signal from a distant source at azimuth angle θ (about +45° as shown here).

When the wavefront (W–W') arrives at the right ear, then it can be seen that there is a path length of (a+b) still to travel before it arrives at the left ear. By the symmetry of the configuration, the b section is equal to the distance from the head centre to wavefront W–W', and hence: b=r.sin θ Also, it will be clear that the a section represents a proportion of the circumference, subtended by θ. By inspection, then, the path length (a+b) is given by:

$$\text{path length} = \left(\frac{\theta}{360}\right)2\pi r + r \cdot \sin\theta \quad (1)$$

(This path length (in cm units) can be converted into the corresponding time-delay value (in ms) by dividing by 34.3.)

It can be seen that, in the extreme, when θ tends to zero, so does the path length. Also, when θ tends to 90°, and the head diameter is 17.5 cm, then the path length is about 22.5 cm, and the associated ITD is about 656 μs. This corresponds well to measurements made on an artificial head, using a method of impulse correlation at the ears, as is shown in FIG. 4. In order to provide greatest ITD accuracy for HRTF applications, a polynomial expression is fitted to the measured data, and this is represented by the solid line.

Although the simple derivation relates only to the front-right quadrant in the horizontal plane (angles of azimuth between 0° and 90°), it can be used as an approximation for use in all four quadrants, because the front-right and right-rear quadrants are somewhat symmetrical about the lateral axis, and both right quadrants are somewhat symmetrical with both left quadrants. (Of course, in this latter case, the time-delays are reversed, with the left-ear signal leading the right-ear signal, rather than lagging it.) Nevertheless, for greatest accuracy, a polynomial fit to measured data is much preferred, because it can be seen from FIG. 4 that there is a slight asymmetry in the measured data, owing, no doubt, to the asymmetrical shape of the head and also to the slightly rearward positioning of the ears on the side of the head.

Advanced ITD Models

It is possible to adopt a more comprehensive approach to the modelling of the inter-aural time delay. However, as the simple geometric approach described above yields identical results as the high-frequency asymptotic value of Kuhn ("Model for the interaural time differences in the azimuthal plane", G F Kuhn, J. Acoust. Soc. Am., 62, (1), 1977, pp. 157–167), referred to by Shaw ("Acoustical features of the human external ear", E A G Shaw in Binaural and Spatial Hearing in Real and Virtual Environments, R H Gilkey and T R Anderson (Eds.), Erlbaum, New Jersey (1997), pp. 25–47), and bearing in mind the inadequate accuracy of the head model (namely, a simple sphere), then the polynomial-fit method seems the best method of ITD characterisation. Accordingly, data used to describe ITD scaling, below, will be based on a 6th order polynomial, derived by the authors. (In fact, it is preferable to use a three-dimensional surface for the ITD, because they are also slightly non-symmetric in the vertical plane, but this detail has been omitted here for clarity.) It will be clear, at this stage, that the HRTF properties are attributed to a very complicated set of inter-related phenomena, and that there can be considerable dimensional variation in the associated physiological parameters.

3.3 Scaling the HRTF

How might it be possible, then, to create a range of HRTFs for user selection, other to than by measuring many real HRTFs from volunteers, and then attempting to rationalise them into groups? The key to the present invention is the realisation that the complex resonant and diffractive effects which are integral to the HRTF can be scaleable independently. First, consider the outer ear. It comprises several interconnected cavities, coupled to the auditory canal. Each cavity possesses a number of resonant modes, each stimulated from differing directions. Consequently, one can consider the spectral properties of the whole ear as the summation of many individual, direction-dependent resonators. If one were to scale the ear up in size and, say, make it 15% larger, then the resonant properties of all the cavities would change proportionately, such that the resonant frequencies would all decrease by 15%, and the associated spectral data would be compressed by a 15% factor in the frequency domain. And if one were to scale the ear down in size by 15%, than the spectral data would be expanded by a 15% factor in the frequency domain. The inter-aural time delay would not be significantly affected by such up- and down-scaling. Accordingly, one can scale an HRTF derived from an average size pair of ears so as to correspond to an HRTF derived from larger or smaller-sized physical ears by compressing or expanding, respectively, the spectral data in the frequency domain, whilst leaving the ITDs unaffected.

Next, consider the acoustic effects of the head. The head contributes two major influences to the HRTF. Firstly, the inter-aural time-delay is governed by the ear-spacing and head shape, as has been described in detail, above. Secondly, the head acts as a baffle, which creates diffraction effects at the far-ear. However, the diffraction effects are relatively gross and they are not particularly a critical feature of the HRTF, mainly contributing to HF roll-off and attenuation of the far-ear signal. Incremental dimensional changes, such as the ±15% example used above, do not affect these effects significantly. However, the inter-aural time delay is directly proportional to head size, as shown by equation 1. Accordingly, one can scale an HRTF derived from an average size head so as to correspond to an HRTF derived from larger or smaller-sized physical head by compressing or expanding, respectively, the ITD data (in the time domain), whilst leaving the spectral data unaffected.

This provides a duplex scaling system, in which head size and ear size can be both independently scaled. In a single population, one might expect the ear and head sizes to scale with each other (i.e. large people possess large ears). However, it might be a characteristic of differing populations that the ear and head sizes do not necessarily scale together, in which case it is advantageous to provide the means to adjust HRTF data separately. For example, the present invention could provide a combination of either small, medium or large ears with a small, medium or large head, thus providing nine user-selectable options. Note that this would require only three spectral data options and three ITD arrays, because they are used together in combination, and so the system is very efficient.

3.4 Ear-dependent Scaling of Spectral Sata

The spectral data of the HRTF, i.e. the frequency dependent far- and near-ear amplitude functions, can be scaled in the frequency domain by linear interpolation, as will now be described. A typical pair of far- and near-ear responses are shown in FIG. 5, based on data from an artificial head with average size ears (and no ear canal simulators present). These characteristics are not unusual; there are many similar examples in the literature. In this case, the near-ear amplitude peak lies at around 2.9 kHz.

In practise, the amplitude vs. frequency characteristics are used in a filter design process which creates coefficient sets for the FIR digital filters which process the audio. In order to expand or compress the spectral data in the frequency domain, the x-axis is re-scaled and the amplitude data is relocated on to the revised scale by linear interpolation. For a dear explanation of this, FIG. 6 shows the first few data points, together with the relevant parameters which will be used in the description.

The x-axis represents frequency (in Hz units), and the y-axis represents amplitude (dB units). The standard spectral data is plotted as $x_n$ values on the x-axis (0 to 22.05 kHz), where n is an integer value between 1 and 128, and $y_n$ values on the y-axis (−30 to +10 dB). The standard interval (SI) represents the frequency interval between $x_n$ values; in this example, it is 172 Hz.

The x-axis is re-scaled by a scaling factor which, for the present purposes, lies between around 0.75 to 1.25. In the following example, we shall expand the frequency scale, using a scaling factor of 1.15. The re-scaled x-ordinates are represented by the points $p_n$, with associated y-ordinates which are equal to $y_n$. The expanded interval represents the revised frequency interval between $p_n$ values, and the difference between the expanded interval and the standard interval (SI, 172 Hz) is represented by D (25.8 Hz).

In order to calculate and map the revised amplitude values on to the standard frequency scale, we need to find the two adjacent values of $p_n$ lying on either side of each value of $x_n$, and then interpolate a new amplitude value, $q_n$, which corresponds to the value of $x_n$.

By inspection of FIG. 6, it can be seen that:

$$p_n = x_n + (n+1)\Delta \quad (2)$$

and:

$$p_n = n(SI) + (n+1)\Delta \quad (3)$$

from which:

$$n = \frac{(p_n - \Delta)}{(SI + \Delta)} \quad (4)$$

and so, given any frequency value from the standard scale, it is now possible to calculate an equivalent index coefficient, n, associated with the expanded scale. For example, in FIG. 6, above, it can be seen that the $x_n y_n$ co-ordinates have been expanded to the right, forming the new $p_n y_n$ co-ordinates. In order to determine the revised amplitude value on the expanded curve for, say, $x_3$, then we must find which index number on the p-scale corresponds to 3. Using equation (4) to do this yields a non-integer number, and so the truncation of this number yields the integer index number of the p-point below and adjacent to $x_3$ (call it f), and this integer number plus one yields the integer index number of the p-point above and adjacent to $x_3$ (call it g) For example, solving for $x_3$ using the above values in equation (4) yields:

$$n = \frac{(x_3 - 25.8)}{(172 + 25.8)} = \frac{(516 - 25.8)}{(197.8)} \cong 2.739 \quad (5)$$

and so the index number of the p-points which are to be used for the interpolation are f=2 (the truncation of 2.739) and g=3, as can be verified in FIG. 6, where points $p_2$ and $p_3$ straddle $x_3$. This example is trivial, but helps clarify the situation at higher frequencies or for more severe expansion when the lateral displacement exceeds one standard interval, which would make the indexing ambiguous.

So, now the p-point index n has been calculated for the required value of $x_n$, and we have established f and g, we can calculate $p_f$ and $p_g$, which yield $y_f$ and $y_g$.

Figure 10:
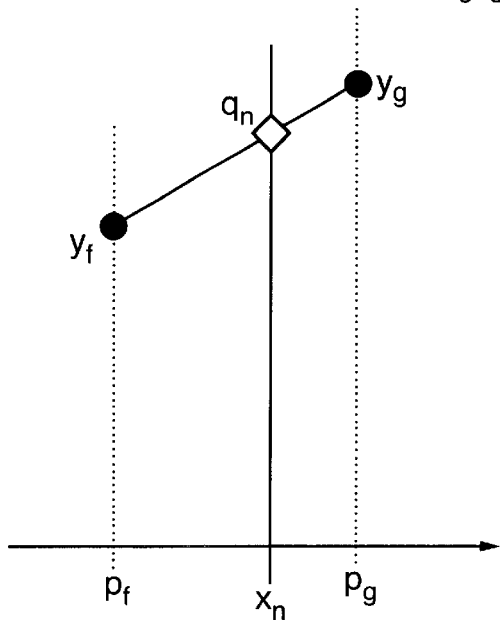

This enables interpolation of the expanded characteristic, as shown in FIG. 10, between $p_f y_f$ and $p_g y_g$, yielding a value for $q_n$ at $x_n$:

$$q_n = y_f + \left\{\frac{x_n + p_f}{p_g + p_f}\right\}\{y_g - y_f\} \quad (6)$$

The results of this are shown in FIG. 7, which depicts the standard near-ear function of FIG. 5, which has been expanded and compressed using scaling factors of 1.15 and 0.85 respectively.

3.5 Head-dependent Scaling of ITD.

As described above, the inventors use a polynomial function, fitted to experimental data, to derive the ITD values for a standard HRTF library. The two-dimensional function is of the form:

$$ITD = ax^6 + bx^5 + cx^4 + dx^3 + ex^2 + fx + g$$

where x represents the azimuth angle. This equation is used to derive the inter-aural delay as a function of azimuth angle in the range 0° to 180° degrees (the 180° to 360° values being symmetrical to these, but with the time-delays reversed, of course). In order to scale the HRTF data with head size, the head-scaling factor is simply applied directly and proportionately to the standard ITD values which derive from the above calculation. The results are shown in FIG. 8, which depicts an up-scaling and down-scaling of the ITD vales by ±15%.

In addition to the expansion (or contraction) of the entire HRTF, it is possible to shift the characteristic along the frequency axis to the left or right by adding (or removing) an offset at the low-frequency end of the spectrum. This enables a more comprehensive manipulation of the standard HRTF to fit a user's own optimum HRTF. For example, in FIG. 7, it can be seen that the major peak occurs at around 2.9 kHz in the standard curve, and the effect of expanding and compressing the characteristic not only widens or compresses the resonant peak, but also has the effect of shifting the peak to a higher or lower frequency. The peak could be restored, if so desired, or moved to a different position, by carrying out additional expansion or contraction of the LF section of the HRTF, say between 0 Hz and 250 Hz. This is because there is little or no spectral detail present at low-frequencies. This is depicted in FIG. 9, which shows the compressed and expanded data from FIG. 7 which has been further adjusted so as to share a common frequency for the amplitude peak (at 2.9 kHz). The adjustment which has been made is an upward shift of 344 Hz for the compressed curve, and a downward shift of 516 Hz for the expanded curve.

In a further refinement of the above technique, it has been observed that in some individuals there is a slight rim present around the edge of the concha, thus making it less "open", but otherwise having the same dimensions and the same volume as other ears. This feature has been observed to accentuate the primary resonances in the ear response function, whilst not affecting the resonant frequencies ("External ear response and localisation", E A G Shaw, Chapter 2, "Localisation of Sound: Theory and Applications", Edited by R W Gatehouse, Amphora Press, Connecticut (1982) ). HRTFs tailored to be suitable for individuals having this shape of ear can be achieved simply by scaling the magnitude of the amplitude data present in the ear response functions, for example by increasing (or decreasing) the gain factor, as illustrated in FIG. 11. In this Figure, the amplitude of the standard near ear response function shown in FIGS. 5 and 7 has been multiplied by gain factors of 0.8 and 1.2. All three response functions are shown on the same scale. In FIG. 11 there has also been an offset adjustment of −2.25 dB for the response multiplied by 0.8, and of +2.25 dB for the response multiplied by 1.2, in order to align the response curves at low frequencies. Note that these gain factors (0.8 and 1.2) have been used to multiply the logarithm of the actual amplitude values, which is equivalent to applying the corresponding power function to linear gain values.

The method may be put into effect using known signal processing apparatus, such as, for example, a suitably programmed digital computer. The library of modified HRTFs may be stored in a storage means such as, for example, a semiconductor memory, or a magnetic disc or tape, or an optical disc.

Differential spectral response functions (known as EQs) may be produced to modify, for example, a piece of music which was recorded using processing destined for a particular size of ear and or head. Re-processing, based on the difference between a standard function and a scaled function, would create a tonal correction for the listener.

In summary, although there are bound to be small interactions between the discussed scaling factors, each scaling factor may be applied independently to a standard HRTF or library of HRTFs to tailor the response for an individual having a different particular physical factor to that of the artificial head used for generating the original standard HRTFs. The scaling factors are found to correspond to the following characteristics:

1. Head size—ITD scaling.
2. Ear size—Spectral expansion/compression of ear response function.
3. Concha depth—Spectral lateral shift of ear response function.
4. Concha profile shape—Amplitude expansion/compression of ear response function.

What is claimed is:

1. A method of modifying at least one head-related transfer function (HRTF) derived from a head having standard dimensions and carrying pinnae of standard dimensions, each HRTF comprising a near-ear response function, a far-ear response function, an inter-aural delay (ITD), said method comprising:

multiplying an ITD value of said at least one HRTF by a constant scaling factor independent of frequency, to provide a modified HRTF corresponding to a head having a different dimension to a standard dimension;

multiplying at least one of said near-ear response function and said far-ear response function of said at least one HRTF by a given scaling factor in the frequency domain independent of time delay, to expand or compress said function(s) in the frequency domain, to provide a modified HRTF corresponding to ears having a different dimension to a standard dimension;

providing at least one of said near-ear response function and said far-ear response function of said at least one HRTF with an offset value in the frequency domain; and multiplying an amplitude of at least one of said near-ear response function and said far-ear response function of said at least one HRTF by a given gain factor which is independent of frequency.

2. The method of modifying at least one head-related transfer function (HRTF) derived from a head having standard dimensions and carrying pinnae of standard dimensions, each HRTF comprising a near-ear response function, a far-ear response function, and an inter-aural time delay (ITD), according to claim 1, further comprising:

a library of original HRTFs corresponding to positions in space surrounding a preferred position of a listener in use, together with one or more libraries of corresponding modified HRTFs; and selection means to enable said listener to choose a preferred library of modified HRTFs.

3. The method of modifying at least one head-related transfer function (HRTF) derived from a head having standard dimensions and carrying pinnae of standard dimensions, each HRTF comprising a near-ear response function, a far-ear response function, and an inter-aural time delay (ITD), according to claim 1, further comprising:

a library of original HRTFs;

means for producing a library of corresponding modified HRTFs; and selection means to enable said listener to choose which scaling factor and/or offsets to use to perform said modification, thereby to tailor said modified HRTFs to resemble more closely HRTFs corresponding to actual dimensions of at least one of a head and ears of said listener.

4. The method of modifying at least one head-related transfer function (HRTF) derived from a head having standard dimensions and carrying pinnae of standard dimensions, each HRTF comprising a near-ear response function, a far-ear response function, and an inter-aural time delay (ITD), according to claim 1, further comprising:

modifying a plural channel audio signal having cues for perception of an apparent position of one or more sound sources which have been added to said signal using signal processing means implementing a standard HRTF library corresponding to that derived for a head and/or ears having standard dimensions, said modified audio signal resembling an audio signal approximating that derived for a head and/or ears having different dimensions to said standard dimensions; and transforming said plural channel audio signal using a transfer function which provides a difference between a standard HRTF and said modified HRTF.

5. A method of scaling 3D sound allowing customization by a listener by altering at least one HRTF comprising a near-ear response function, a far-ear response function, and an inter-aural time delay (ITD), said method comprising:

multiplying an inter-aural delay (ITD) of said at least one HRTF by a constant scaling factor independent of frequency, to provide a modified HRTF corresponding to a head having a different dimension to a standard dimension;

multiplying at least one of a near-ear response function and a far-ear response function of said at least one HRTF by a given scaling factor in the frequency domain independent of time delay, to expand or compress said at least one HRTF in the frequency domain, to provide a modified HRTF corresponding to ears having a different dimension to a standard dimension;

providing at least one of said near-ear response function and said far ear response function of said at least one HRTF with an offset value in the frequency domain; and multiplying an amplitude of at least one of said near-ear response function and said far ear response function of said at least one HRTF by a given gain factor which is independent of frequency.

6. The method of scaling 3D sound allowing customization by a listener by altering at least one HRTF comprising a near-ear response function, a far-ear response function, and an inter-aural time delay (ITD) according to claim 5, said method further comprising:

providing a library of original HRTFs corresponding to positions in space surrounding a preferred position of a listener in use, together with at least one library of corresponding modified HRTFs; wherein a listener is provided an ability to choose a preferred library of modified HRTFs.

7. The method of scaling 3D sound allowing customization by a listener by altering at least one HRTF comprising a near-ear response function, a far-ear response function, and an inter-aural time delay (ITD) according to claim 5, said method further comprising:

providing a transfer function which provides a difference between a standard HRTF and a modified HRTF customized to more closely resemble that of a listener in use.

8. A method of customizing 3D sound by generating a modified HRTF from an original head-related transfer function (HRTF) comprising:

scaling at least one of a near-ear response function and a far-ear response function of the original head-related transfer function (HRTF) to customize 3D sound based largely on a size of a listener's ear wherein the scaling comprises multiplying the at least one of said near-ear response function and said far-ear response function of said original HRTF by a given scaling in the frequency domain independent of time delay, such that said function(s) are expanded or compressed in the frequency domain; and scaling an inter-aural time delay (ITD) of said original head-related transfer function (HRTF) to customize 3D sound based largely on a size of a listener's head, wherein the scaling comprises multiplying the ITD value of said original HRTF by a constant scaling factor independent of frequency, to provide the modified HRTF corresponding to a head having a different dimension than a standard dimension corresponding to the original HRTF.

9. The method of customizing 3D sound according to claim 8, wherein:

said steps of scaling may be performed independent of one another.

10. The method of customizing 3D sound according to claim 8, wherein:

said ITD is scaled in increments of approximately 15%.

11. A method of customizing 3D sound, comprising scaling at least one of a near-ear response function and a far-ear response function of head-related transfer function (HRTF) to customize 3D sound based largely on a size of a listener's ear; and scaling an inter-aural time delay (ITD) of said head-related transfer function (HRTF) to customize 3D sound based largely on a size of a listener's head, wherein said near-ear response function and said far-ear response function of said HRTF are scaled in increments of approximately 15% wherein said scaling modifies HRTF corresponding to a head having a different dimension than a standard dimension corresponding to the original HRTF.

12. The method of customizing 3D sound according to claim 11, wherein: said ITD is scaled in increments of approximately 15%.

* * * * *